Oct. 29, 1963     A. S. TAKACS     3,108,349
APPARATUS FOR CUTTING SHEETS OF SOFT SEMI-PLASTIC MATERIAL
Filed June 23, 1960     2 Sheets-Sheet 1
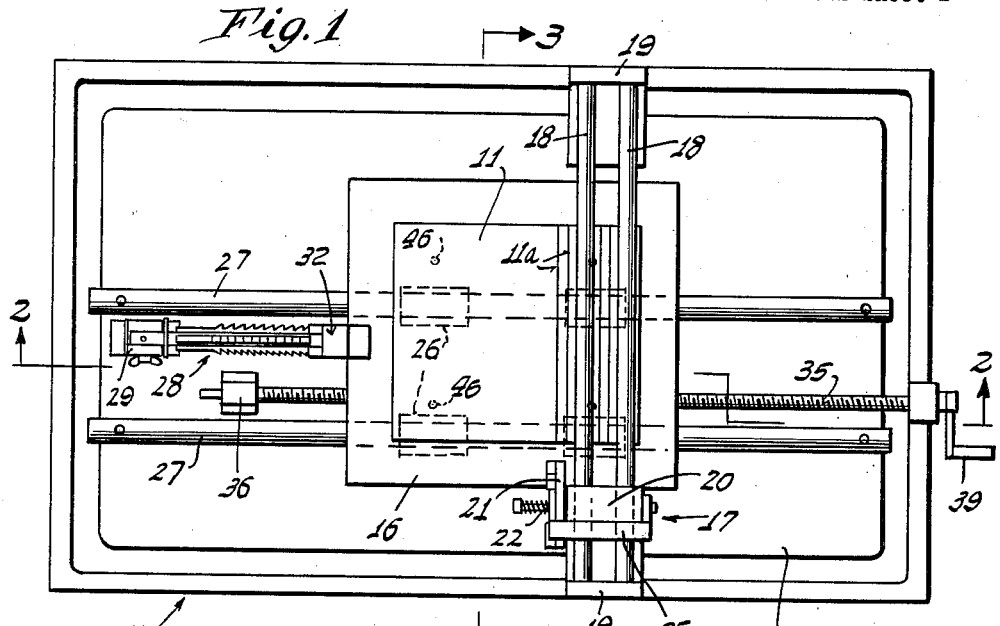
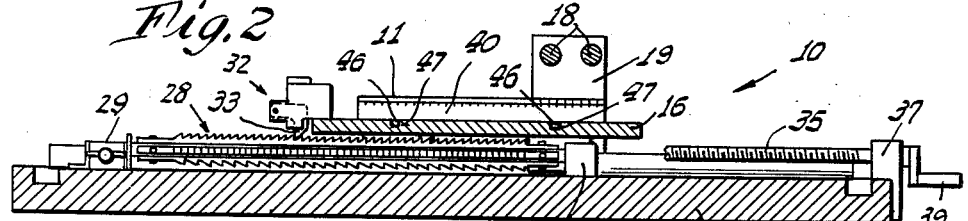
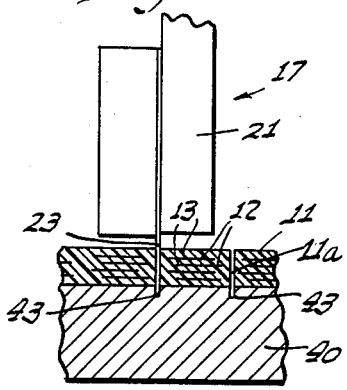
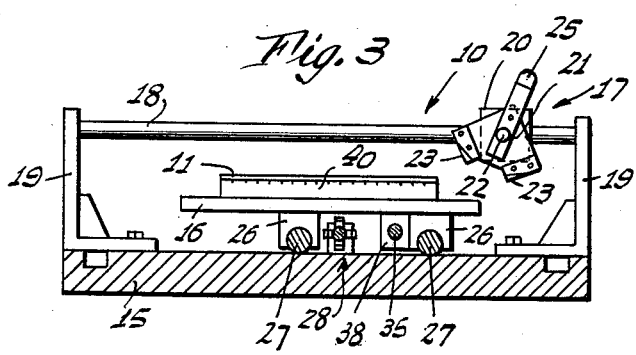
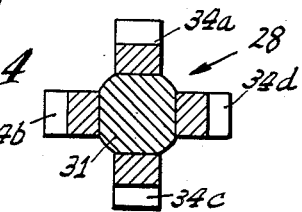
INVENTOR.
Albert S. Takacs
BY
Johnson and Kline
ATTORNEYS Oct. 29, 1963         A. S. TAKACS         3,108,349
APPARATUS FOR CUTTING SHEETS OF SOFT SEMI-PLASTIC MATERIAL
Filed June 23, 1960                         2 Sheets-Sheet 2
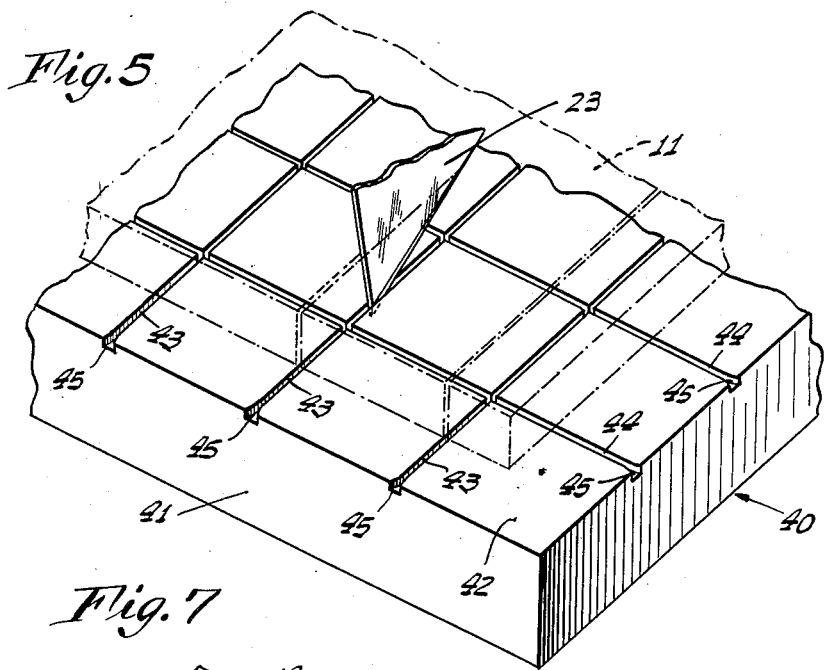
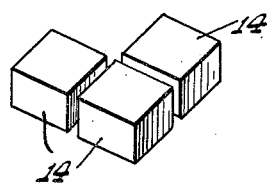
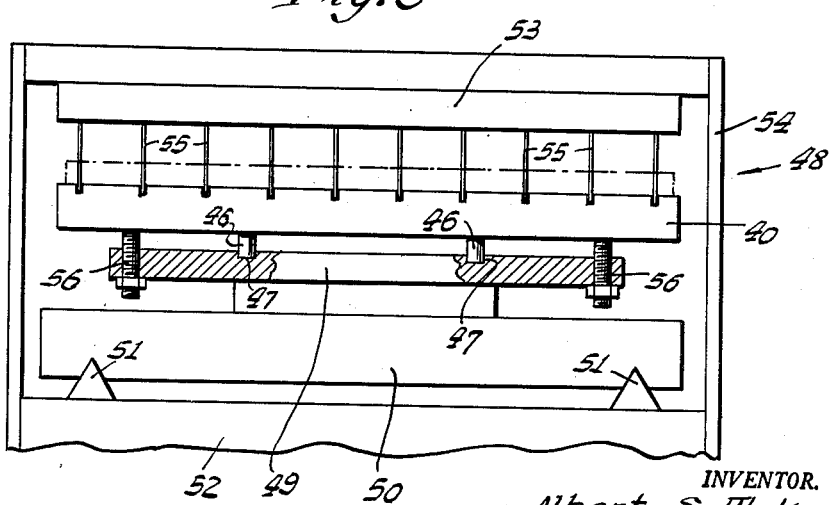
INVENTOR.
Albert S. Takacs
BY
Johnson and Kline
ATTORNEYS

United States Patent Office 3,108,349
Patented Oct. 29, 1963

3,108,349
APPARATUS FOR CUTTING SHEETS OF SOFT SEMI-PLASTIC MATERIAL
Albert S. Takacs, Trumbull, Conn., assignor, by mesne assignments, to Vitramon, Incorporated, Monroe, Conn., a corporation of Delaware
Filed June 23, 1960, Ser. No. 38,381
5 Claims. (Cl. 25—108)

This invention relates to severing bodies from sheets of malleable material or the like. More specifically, it pertains to means for cutting a plurality of bodies from preformed laminated sheets of malleable material and to a method for accomplishing the same.

In certain fields of endeavor, and particularly in branches of the electronics industry, it has been found desirable to form components embodying small bodies by cutting them from preformed sheets of malleable material, this being particularly true where the make-up of the body itself is complicated and difficult to form. For example, in the manufacture of electrical units, as disclosed in the patent to P. W. Lee et al. No. 2,779,975 or the patent to A. J. Deyrup No. 2,389,420, capacitors or similar electronic components are manufactured by building a composite laminated sheet of layers of malleable material having different electrical characteristics, such as layers of electrically conducting and non-conducting material, and then cutting the sheet in a predetermined manner to obtain a plurality of separate bodies with specific characteristics and structure.

In cutting such preformed sheets it is necessary that the cut be controlled and maintained within very fine tolerances along predetermined paths. For instance, in the manufacture of electrical units, wherein the units comprise composite bodies of layers of material including an electrically conducting layer between layers of material having different electrical properties, it is sometimes desired to cut the sheet, from which the bodies are to be formed, in such a manner that the conducting layer or layers are exposed outwardly of an edge of the body. In other instances it may be desired to cut the sheet so that the electrically conducting layer or layers thereof lie wholly within the body and are surrounded by a border of the material having the different electrical properties. It will be seen that where the afore-noted structural requirements must be adhered to and the electrical characteristics of the unit, for which the body is intended, are dependent upon the structure thereof, small variations in the line of cut cannot be tolerated.

Heretofore, the cutting of sheets of malleable material into a plurality of separate bodies, such as in the manufacture of electrical units, has been accomplished by passing a thin blade supported at one end through the material along a predetermined path, the material being supported on the flat plate upon which the sheet was originally built. While this method of cutting the bodies from the preformed sheets of malleable material has proven utility, it will be readily understood that the thin blade, which is supported at only one end, upon meeting resistance in its passage through a dense malleable material will tend to deviate from its predetermined path, thus causing an irregular cut.

The present invention has overcome the problem afore-noted by providing an improved means for cutting small bodies from large preformed sheets of malleable material which does not require the removal of the sheet from the build-up plate before the cutting operation yet provides support for the unsupported end of the cutting blade.

It is an object of the invention to provide means for cutting a plurality of small separate bodies, having predetermined characteristics, from a large preformed sheet of dense malleable material in such a manner that the predetermined line of cut is maintained and the number of reject bodies is substantially reduced.

It is also an object of the invention to provide means for preventing lateral movement of the unsupported end of a thin blade as it traverses a sheet of dense malleable material for cutting the same into separate bodies.

According to the invention, the build-up or material supporting plate is formed in the flat upper supporting surface thereof with grooves disposed in a predetermined manner for receiving the unsupported end of the blade as it traverses the plate to cut the material. While the grooves may be of any desired depth, their width must be such that the unsupported end of the blade is afforded free passage therethrough while lateral movement of the blade is prevented.

In addition to the novel support afforded the cutting blade by the invention, another important feature thereof resides in the tendency of the material, forming the sheet, to flow into the grooves of the build-up plate during the build-up operation thereby preventing relative movement between the sheet and the plate as the former is being cut into a plurality of separate bodies by the blade.

Still another feature of the invention resides in the structure of the supporting plate which facilitates simultaneously removing the individual bodies from the supporting or build-up plate after they have been formed by cutting them from the original sheet and stripping them of excess material. According to the invention, the bodies are removed from the plate by sliding them across the surface thereof transversely of the grooves so that the material which had initially extended into the grooves to lock the sheet in position is scraped therefrom.

Other objects and advantages will be apparent from the specification and claims when considered in connection with the attached sheet of drawings, illustrating one form of the invention, wherein like characters represent like parts, and in which:

FIGURE 1 is a plan view of a sheet cutting apparatus embodying the concepts of the invention;

FIG. 2 is a side elevation, in cross section, of the apparatus of FIG. 1, taken in the direction of the arrows 2—2;

FIG. 3 is an end elevational view, in cross section, of the apparatus of FIG. 1 taken in the direction of the arrows 3—3;

FIG. 4 is an enlarged cross-sectional view of the indexing mechanism of FIG. 1;

FIG. 5 is a fragmentary perspective view of the material support plate maintaining the unsupported end of a thin cutting blade against lateral displacement and showing in dotted lines the material which is being cut;

FIG. 6 is a fragmentary elevational view, in section, of the material supporting plate and cutting blade;

FIG. 7 is a perspective view of a plurality of small separate bodies which have been cut from a large preformed sheet according to the invention; and FIG. 8 is an elevational view of another form of apparatus embodying the concepts of the invention.

Referring now to the drawings for a more detailed description of the invention, in FIGS. 1–3 an apparatus embodying the invention, and generally indicated by the numeral 10, is shown for cutting bodies, of predetermined size and shape, from a preformed sheet 11 of malleable material. The term malleable material is here used to mean any material which is susceptible of being shaped or formed and, specifically, means a material of soft, semi-plastic consistency.

While the present invention has utility in any situation wherein it is desired to cut bodies, having a predetermined structure and characteristics, from a preformed sheet of malleable material, in the illustrated form of the invention, in order to point up the necessity for controlling the cut, the sheet 11 is a laminate of layers of dense malleable material having different electrical properties (see FIG. 6), such as layers 12 of electrically conductive material and layers 13 of electrically non-conductive material. In the instant case the sheet 11 is to be cut into bodies 14 (see FIG. 7) for use in the manufacture of capacitors, the electrical characteristics of which are directly related to the structure. It will be understood that a capacitor, particularly of the type disclosed in the patents to Lee et al. or Deyrup, is composed of a composite body of layers including an electrically conducting layer between layers of electrically non-conducting material, and when cutting the body from a large preformed sheet the location of the conducting layer in relation to the sides of the body is determined by the cut. In capacitors requiring the exposure of the conducting layer outwardly of the side of the body, such as for the connection of a lead thereto, an uncontrolled cut can result in the insulation of the conducting layer from the body surface, and, similarly an uncontrolled cut can expose the conducting layer or substantially reduce the insulation therearound in capacitors in which the conducting layer must lie wholly within the body and be covered by a protecting border.

The cutting apparatus 10, which may be power operated in whole or in part but in the illustrated form of the invention is manually operated to simplify the explanation, includes a base 15 having supported on the upper surface thereof a mounting means 16, in the form of a table, and a cutting means 17. The cutting means 17 is movably carried by rails 18 which are fixedly mounted with respect to the base through posts or brackets 19 and is adapted to traverse the base for a purpose to be hereinafter explained. While any cutting means known to the art having a thin cutter with an unsupported cutting edge may be utilized in the present invention, in the illustrated embodiment of the invention the cutting means includes a housing 20 slidably carried by the rails 18 and a blade carrier member 21 pivoted to the housing as at 22 for rocking movement thereabout. The blade carrier has connected thereto a pair of opposed thin cutting blades 23 which are adapted to be alternately rocked into cutting position by a handle 25 as the cutting means is traversed back and forth across the base for exposing the cutting surface of a blade to the material to be cut.

The table or mounting means 16, which is preferably movable relative to the cutting means 17, has brackets 26 depending from the underside thereof for slidably engaging a pair of spaced rails 27, carried by the base, whereby the table is adapted to longitudinally traverse the base below the cutting means 17. Mounted between the rails 27 and extending substantially parallel thereto is an indexing mechanism 28 for controlling the relative movement of the mounting means 16 and cutting means 17. The indexing mechanism 28, which is rotatably supported on base 15 in bearings 29 and 30, comprises a spine 31 having a plurality of rows of ratchet teeth adapted to be engaged by a dog mechanism 32, including a spring-pressed dog 33. Although it will be understood that the indexing mechanism may include any number of rows of ratchet teeth whereby various step-by-step adjustments of the table 16 past the cutting means 17 may be achieved, in the illustrated form of the invention, as shown most clearly in FIGS. 1, 2 and 4, the spine 31 is provided on its surface with four rows of ratchet teeth 34a, b, c and d disposed substantially 90° apart and extending longitudinally of the spine. Each of the rows of ratchet teeth have different spacing from the other rows thereof so that on rotating the indexing mechanism 28 in the bearings 29 and 30 the table can be indexed past the cutting means in different desired increments located by the dog 33 as it engages the ratchet teeth.

In order to facilitate the movement of the table 16 past cutting means 17 and to lock the dog 33 in engagement with the ratchet teeth, a drive in the form of a worm 35 is provided. The worm which is carried in bearings 36 and 37 on base 15 is connected to the underside of table 16, as at 38, so that rotation of the worm by handle 39 will move the table along the base. As the table is moved along the base, the dog 33 rides over successive teeth of the ratchet row being used for the particular cutting operation and defines the increments of movement of the table. By backing off the worm drive after the dog has engaged a tooth of the ratchet, the dog is locked in engaged position.

In the operation of the cutting apparatus 10, as aforedescribed, a sheet 11 of malleable material that has previously been formed on a flat surfaced build-up plate may be cut into a plurality of small bodies by positioning the build-up plate, with the sheet thereon, on the table 16 so that, as the table is indexed across the path of the cutting means and the latter traverses the table, the sheet is cut in a desired manner. This method of cutting sheets of malleable material presents few problems where the material is not dense, since little resistance is provided for the unsupported end of the cutting blade. In cutting dense malleable materials, however, such as ceramics or porcelain materials of the kind that might be utilized in the manufacture of capacitor bodies or the like resistance to the movement of the blade through the material causes the unsupported end of the blade to waver thus producing variations in the line of cut.

The present invention has overcome this problem by providing a novel support or build-up plate 40 (see FIGS. 2, 3, 5 and 6) which may be utilized in the build-up operation of the sheet in a manner similar to the flat support plates of the prior art, and, additionally, when utilized in combination with the cutting apparatus, supports the unsupported end of the cutting blade and prevents lateral movement thereof. The support plate 40, according to the invention, comprises a body 41 having a flat upper surface 42 for supporting the sheet material thereon. The upper surface is formed with a plurality of spaced parallel grooves 43 extending in one direction across the plate and a plurality of similar grooves 44 extending normal to the first grooves. The grooves 43 and 44, which preferably are only deep enough to receive the unsupported end of the blade, have a width substantially the same as the width of the blade whereby free passage of the blade therethrough is facilitated while lateral movement of the blade, out of the line of cut, is prevented. The grooves extend completely across the surface of the plate and open outwardly of the sides of body 41, and, in the preferred form of the invention, are provided with enlarged end openings 45 for guiding the blade into the groove as the cutting means traverses the plate.

It should here be noted that the grooves are so spaced that when the plate 40 is positioned in a predetermined manner on table 16 a relationship is established with the blade of the cutting means which will result in one of the grooves being aligned with the blade each time the table is indexed one step across its path. In order to predeterminately position the support plate 40 on table 16 to establish the desired relationship with the cutting means 17, the plate is provided on its under surface with a plurality of studs 46 which are adapted to be received in openings 47 of table 16.

In the operation of the apparatus 10 in combination with support plate 40, the plate with a preformed sheet of malleable material thereon is positioned on table 16 and the cutting means 17 is traversed thereacross so that the blades 23 enter seriatim into the grooves 43 to cut the material, as shown at 11a in FIGS. 1 and 6. After all of the cuts have been made through the material in one direction the support plate 40 is lifted from table 16 and rotated 90° so that the grooves 44 will be in position to be aligned with the blades as the cutting operation is repeated. In this manner, a plurality of bodies may be formed from a sheet of malleable material by a thin cutting blade that is so contained that variations in the line of cut are prevented.

Referring now to FIG. 8, an alternative form of apparatus for cutting sheets of malleable materials, generally indicated by the numeral 48, is shown. In this form of the invention a table 49 mounted by a carrier 50 is slidably carried on tracks 51, connected to a base 52, for movement below a gang cutter 53. The gang cutter 53 which is fixedly mounted by a frame 54 carried by the base, includes a plurality of thin parallel cutting blades 55 supported at their upper ends. According to this form of the invention, the support plate 40, which is substantially identical to the support plate previously described with respect to FIGS. 1 through 6, is adjustably mounted on the table 49 and is predeterminately positioned thereon relative to the blades 55 by engagement of the studs 46 in openings 47 formed in the table. While the plate may rest on the surface of the table, as in the previously described embodiment of the invention, in the form of the invention illustrated in FIG. 8, it is supported upon a plurality of threaded members 56 which extend upwardly through the table into engagement with the bottom of the plate. By means of the threaded members 56 the relationship between the support plate 40 and the gang cutter 53 can be adjusted.

It will be understood that when operating the apparatus of FIG. 8 the plate 49, having a preformed sheet of malleable material thereon, will be positioned on the table 49 and the table along with its carrier will be moved across the base over rails 51 so that the blades 55 of the gang cutter traverse the plate to cut the material. Thereafter, the plate may be removed from the table and oriented 90° to make the second cut through the material.

The material support plate 40 of the present invention, in addition to preventing lateral movement of the unsupported end of the cutting blade or blades, cooperates with the sheet material to prevent displacement of the latter during the cutting operation. It has been found that when a sheet of malleable material is formed on the support plate 40, there is a tendency for some of the material to flow into the grooves, thus locking the material against movement relative to the plate as pressure is applied thereto by the cutting blades. In order to remove the excess material, that has flowed into the grooves and locked the sheet to the plate, after the bodies have been cut from the sheet, it is merely necessary to slide the bodies across the surface of the plate transversely of the grooves so that the grooves scrape the excess material therefrom.

Thus, among others, the several objects and advantages of the invention, as afore-noted, are achieved. Obviously numerous changes in structure may be resorted to without departing from the spirit of the invention as defined by the claims.

I claim:

1. In combination with an apparatus for cutting a laminated sheet of soft semi-plastic material into a plurality of separate bodies including a base, mounting means providing a supporting surface carried by said base and cutting means adapted to traverse across the supporting surface of said mounting means, said cutting means including a thin cutting blade member supported at one end, said mounting means and cutting means being movable relative to each other; a support plate removably carried by said mounting means on the supporting surface thereof and adapted to support said sheet material, said plate comprising a body having a flat upper surface for supporting said sheet material, groove means forming part of said surface and extending only partially through said body for receiving the unsupported end of said blade member as the latter traverses said mounting means for cutting said sheet material, said groove means being of such a width as to receive portions of said sheet material for retaining the sheet relative to said surface and permit the free passage of the blade member therethrough and prevent lateral displacement of the blade member, the edges of said groove means forming shear means for removing said portions of said soft semi-plastic material in said groove means when said sheet is moved transversely of said surface, and means for positioning said plate in a predetermined relationship with said mounting means, whereby relative movement of said mounting means and cutting means exposes a different portion of said sheet to said blade member to be cut thereby.

2. In combination with an apparatus for cutting a laminated sheet of soft semi-plastic material into a plurality of separate bodies including a mounting means for providing a supporting surface, cutting means adapted to traverse across the supporting surface of said mounting means, said cutting means including a thin cutting blade member supported at one end, and means for relatively indexing said mounting means and cutting means normal to the path of travel of said cutting means across said supporting surface; a support plate removably carried by said mounting means on the supporting surface thereof and adapted to support said sheet material, said plate comprising a body having a flat upper surface for supporting said sheet material, said upper surface being formed with a first group of a plurality of spaced parallel grooves extending only partially through said body in one direction and a second group of a plurality of spaced parallel grooves similar to said first grooves but normal thereto, said grooves receiving the unsupported end of said blade member as the latter traverses said mounting means for cutting said sheet material and being of such a width as to permit the free movement of the blade member end therethrough and prevent the lateral shifting of the blade member, means for guiding said blade member into said grooves and means cooperating between said plate and said mounting means for selectively positioning said plate in a predetermined relationship with said supporting surface of said mounting means for positioning said first and second groups of grooves to be indexed across the path of travel of said cutting means.

3. In combination with an apparatus for cutting a laminated sheet of soft semi-plastic material into a plurality of separate bodies including a base, mounting means providing a supporting surface carried by said base, cutting means adapted to traverse across the supporting surface of said mounting means, said cutting means including a thin cutting blade member supported at one end, and means for relatively indexing said mounting means and cutting means; a support plate removably carried by said mounting means on the supporting surface thereof and adapted to support said sheet material, said plate comprising a body having a flat upper surface for supporting said sheet material, means forming part of said surface for receiving the unsupported end of said blade member as the latter traverses said mounting means for cutting said sheet material, and means cooperating between said plate and said mounting means for positioning said plate in a predetermined relationship on the supporting surface of said mounting means, said means for receiving said blade member end including a plurality of spaced parallel grooves extending only partially through said body and adapted to be aligned with said blade member as said mounting means and cutting means are relatively indexed for receiving the unsupported end of the blade member and including a plurality of spaced parallel grooves normal to said first grooves extending only partially through said body and adapted to be aligned with said blade member for receiving said blade member end in the same manner as said first grooves when said plate is rotated 90° relative to said mounting means, said grooves each being of a width to prevent lateral movement of the blade member as the latter traverses the mounting means for cutting the sheet material.

4. In combination with an apparatus for cutting a laminated sheet of soft semi-plastic material into a plurality of separate bodies including a base, mounting means providing a supporting surface movably carried by said base, cutting means adapted to traverse across the supporitng surface of said mounting means, said cutting means including a thin cutting blade member supported at one end, and means for indexing said mounting means transversely across the path of said cutting means; a support plate removably carried by said mounting means on the supporting surface thereof and adapted to support said sheet material, said plate comprising a body having a flat upper surface for supporting said sheet material, means forming part of said surface for receiving the unsupported end of said blade member as the latter traverses said mounting means for cutting said sheet material, and means cooperating between said plate and said mounting means for positioning said plate in a predetermined relationship with said mounting means, said means for receiving said blade member end including a plurality of grooves extending only partially through said body and opening outwardly of the sides of said body and adapted to be aligned seriatim with said blade member for receiving the unsupported end thereof as said mounting means is indexed across the path of said cutting means and including a plurality of grooves normal to said first grooves extending only partially through said body for receiving said unsupported end of said blade member in the same manner as said first grooves when said plate is rotated 90° relative to said mounting means, said grooves being of such a width as to permit free passage of the blade member end therethrough and prevent lateral movement of the blade member.

5. In combination with an apparatus for cutting a laminated sheet of soft semi-plastic material into a plurality of separate bodies including mounting means providing a supporting surface, cutting means adapted to traverse across the supporting surface of said mounting means, said cutting means including a thin cutting blade member supported at one end, and means for relatively indexing said mounting means and said cutting means in a predetermined manner in a direction normal to the path of travel of said cutting means; a support plate removably carried by said mounting means on the supporting surface thereof and adapted to support said sheet material, said plate comprising a body having a flat upper surface for supporting said sheet material, said upper surface being formed with groove means extending only partially through said body for receiving the unsupported end of said blade member as the latter traverses said mounting means for cutting said sheet material, said groove means including a plurality of spaced parallel grooves having a width adapted to permit passage of the blade member end therethrough and prevent lateral movement of the blade member and a plurality of spaced parallel grooves substantially the same as said first grooves extending normal thereto, means cooperating between said plate and said mounting means for positioning said plate in a predetermined relationship with said supporting surface of said mounting means so that said first grooves receive said blade member end when said cutting means traverses said mounting means and means cooperating between said plate and said mounting means when said plate is rotated 90° relative to said mounting means for positioning said plate in a second predetermnied relationship with said supporting surface of said mounting means so that said second grooves receive said blade member end when said cutting means traverses said mounting means.

References Cited in the file of this patent

UNITED STATES PATENTS

| | | |
|---|---|---|
| 858,997 | Low | July 2, 1907 |
| 1,463,393 | Heilman | July 31, 1923 |
| 1,845,731 | Stoddard | Feb. 16, 1932 |
| 2,324,751 | Williams | July 20, 1943 |
| 2,409,203 | Gale | Oct. 15, 1946 |
| 2,550,862 | Reinecker | May 1, 1951 |
| 2,609,564 | Grimm | Sept. 9, 1952 |
| 2,724,435 | Omenson | Nov. 22, 1955 |
| 2,833,350 | Merkur | May 6, 1958 |

FOREIGN PATENTS

| | | |
|---|---|---|
| 966,769 | Germany | Sept. 5, 1957 |